(12) United States Patent
Mitsuta et al.

(10) Patent No.: US 9,204,106 B2
(45) Date of Patent: Dec. 1, 2015

(54) LOAD DISPLAY DEVICE FOR DUMP TRUCK

(75) Inventors: Shinji Mitsuta, Hiratsuka (JP); Shigeru Harada, Chigasaki (JP); Tomikazu Tanuki, Fujisawa (JP); Eishin Masutani, Hiratsuka (JP); Yukihiro Nakanishi, Hiratsuka (JP); Takeshi Kurihara, Hiratsuka (JP); Dai Tsubone, Hiratsuka (JP); Masaomi Machida, Hiratsuka (JP)

(73) Assignee: KOMATSU LTD., Tokyo (JP)

( * ) Notice: Subject to any disclaimer, the term of this patent is extended or adjusted under 35 U.S.C. 154(b) by 410 days.

(21) Appl. No.: 13/811,475

(22) PCT Filed: May 23, 2012

(86) PCT No.: PCT/JP2012/063228
§ 371 (c)(1),
(2), (4) Date: Jan. 22, 2013

(87) PCT Pub. No.: WO2012/169358
PCT Pub. Date: Dec. 13, 2012

(65) Prior Publication Data
US 2013/0120579 A1    May 16, 2013

(30) Foreign Application Priority Data
Jun. 7, 2011   (JP) .................................. 2011-127225

(51) Int. Cl.
*H04N 7/18*    (2006.01)
*B60R 1/00*    (2006.01)
(Continued)

(52) U.S. Cl.
CPC *H04N 7/18* (2013.01); *B60P 1/283* (2013.01); *B60R 1/00* (2013.01); *B60R 2300/607* (2013.01); *B60R 2300/70* (2013.01); *G01G 19/10* (2013.01)

(58) Field of Classification Search
CPC .............. H04N 7/18; B60P 1/283; B60R 1/00
See application file for complete search history.

(56) References Cited

U.S. PATENT DOCUMENTS

| 2005/0167164 A1* | 8/2005 | Takeda ........................... 177/136 |
| 2009/0309970 A1* | 12/2009 | Ishii et al. ..................... 348/143 |
| 2010/0092042 A1* | 4/2010 | Asari ............................. 382/106 |

FOREIGN PATENT DOCUMENTS

| CN | 1641324 A | 7/2005 |
| JP | 2001-071809 | 3/2001 |

(Continued)

OTHER PUBLICATIONS

International Search Report of corresponding PCT Application No. PCT/JP2012/063228.
(Continued)

*Primary Examiner* — Jefferey Harold
*Assistant Examiner* — Sean Haiem
(74) *Attorney, Agent, or Firm* — Global IP Counselors, LLP

(57) ABSTRACT

A periphery monitoring device (10) comprises a monitor (50) that displays a bird's-eye image (200) that includes an image of a dump truck (1), a payload meter ECU (21) that detects the load of the dump truck (1), and a controller (20) that switches the size of a cargo image (C1) displayed over the vessel (4) of the dump truck (1) and displays this image on the monitor (50) on the basis of the detection result of the payload meter ECU (21).
In a load display device for a dump truck, a plurality of cameras are installed and the load display device monitors the periphery by using a bird's-eye image that combines images obtained by the plurality of cameras. The load display device includes a display component, a detector and a display controller. The display component is configured to display the bird's-eye image including an image of the dump truck. The detector is configured to detect a load of the dump truck. The display controller is configured to switch a size of a simulated cargo image displayed over a vessel of the dump truck based on a detection result of the detector and to display the simulated cargo image on the display component.

5 Claims, 7 Drawing Sheets

| (51) | Int. Cl. | | JP | 2009-239754 | 10/2009 |
| --- | --- | --- | --- | --- | --- |
| | *B60P 1/28* | (2006.01) | JP | 2009-292254 | 12/2009 |
| | *G01G 19/10* | (2006.01) | | | |

OTHER PUBLICATIONS

(56) References Cited

The Chinese Office Action for the corresponding Chinese application No. 201280002189.7, issued on Jan. 13, 2014.

FOREIGN PATENT DOCUMENTS

JP    2006-112796    4/2006

\* cited by examiner (a)

(b)

LOAD DISPLAY DEVICE FOR DUMP TRUCK

CROSS-REFERENCE TO RELATED APPLICATIONS

This application claims priority to Japanese Patent Application No. 2011-127225 filed on Jun. 7, 2011, the disclosure of which is hereby incorporated herein by reference in its entirety.

BACKGROUND OF THE INVENTION

1. Field of the Invention

The present invention relates to a load display device for a dump truck.

2. Description of the Related Art

The dump trucks used in mining and other such work have a vehicle width (such as about 5 m) that is markedly larger than that of ordinary trucks. Since the cab in which the driver sits is provided to the left on the deck at the front of the body, the driver is able to visually check only a portion on the left-front side.

Accordingly, dump trucks are equipped with a plurality of cameras on the deck where the cab is located and at other locations, and the images acquired by these cameras are used to produce a bird's-eye image that is displayed on a monitor screen installed in the cab, so that the periphery can be monitored.

Also, the driver in the cab of a dump truck cannot use mirrors or the like to visually check whether or not the earth, ore, or other such cargo has been loaded into the vessel since the vessel is provided to the rear of the cab.

Japanese Laid-Open Patent Application 2006-112796, for example, discloses a vehicle load measuring device with which the pressure of suspension cylinders is detected and the empty load of a dump truck can be accurately measured in a delivery vehicle in which the body on which the cargo is loaded is supported by a plurality of suspension cylinders.

SUMMARY

However, the following problems were encountered with the above-mentioned conventional load measuring device.

Specifically, with the load measuring device disclosed in the above-mentioned publication, the empty load can be accurately measured, but since it is merely displayed as a numerical value on a monitor, the driver in the cab has difficulty intuitively recognizing the load situation.

Meanwhile, the above-mentioned monitor used for periphery monitoring is provided inside the cab where the driver sits, and the situation around the vehicle is monitored along with a composite image of the dump truck at all times.

It is an object of the present invention to provide a load display device for a dump truck with which a monitor used for periphery monitoring allows the driver to intuitively recognize the load situation.

The load display device for a dump truck pertaining to the first aspect is a load display device for a dump truck, in which a plurality of cameras are installed and which monitors the periphery by using a bird's-eye image that combines images obtained by the plurality of cameras, said device comprising a display component, a detector, and a controller. The display component displays a bird's-eye image including an image of the dump truck. The detector detects the load of the dump truck. The display controller switches the size of a simulated cargo image displayed over the vessel of the dump truck and displays this image on the display controller, on the basis of the detection result of the detector.

Here, the size of the simulated cargo image displayed over the vessel of the dump truck is switched and displayed according to the detection result for the load placed in the vessel of the dump truck, on a bird's-eye image used for monitoring the periphery of the dump truck.

The switching of the size of the simulated cargo image here includes display switching in which the simulated cargo image is either displayed or not displayed. Detection of the load by the detector includes detection of the weight of the load, detection of the presence of a load, and so forth.

Consequently, the driver of the dump truck can intuitively recognize whether or not there is a load in the vessel merely by checking the periphery monitoring screen provided inside the cab. This prevents the driver from mistakenly thinking there is an empty load.

The load display device for a dump truck pertaining to the second aspect is the load display device for a dump truck pertaining to the first aspect, wherein the display controller switches the size of the simulated cargo image in stages according to the detection result of the detector.

Here, the size of the dump truck cargo combined into a bird's-eye image displayed on the periphery monitoring screen is switched in stages on the basis of the size of the load.

This allows the driver to watch the monitor screen while easily checking how much the load is on the vessel.

The load display device for a dump truck pertaining to the third aspect is the load display device for a dump truck pertaining to the first or second aspect, wherein the display controller displays the simulated cargo image displayed over the vessel of the dump truck, in a different color from that of the image of the dump truck.

Here, the simulated cargo image displayed over the vessel of the dump truck on the bird's-eye image is displayed in a different color from that of the dump truck image, such as in a color that stands out (yellow, orange, red, etc.).

This allows the driver to intuitively tell at a glance whether or not there is a simulated cargo image portion.

In addition to a simulated cargo image portion, the body portion of the dump truck can be displayed in color, and this contrast in the coloration of the simulated cargo image portion makes it easier for the driver to ascertain the loading state of the vehicle.

The load display device for a dump truck pertaining to the fourth aspect is the load display device for a dump truck pertaining to any of the first to second aspects, wherein the detector is a payload meter that weighs the cargo loaded on the vessel.

Here, a payload meter is used as the detector for detecting the load.

This makes it easy to detect the weight of the load placed on the vessel.

The load display device for a dump truck pertaining to the fifth aspect is the load display device for a dump truck pertaining to the fourth aspect, wherein the payload meter is attached to a suspension cylinder that supports the vessel from below.

Here, the above-mentioned payload meter is attached to a suspension cylinder that supports the vessel from below. Because the payload meter is provided to the suspension cylinder, which directly bears the weight of the load, the load can be easily detected.

DESCRIPTION OF THE EMBODIMENTS

The dump truck load display device pertaining to an embodiment of the present invention will now be described through reference to FIGS. 1 to 6.

In the following description, "front," "rear," "left," and "right" refer to directions based on the direction seen by the driver when seated in the cab and facing forward. The "vehicle width direction" is defined the same as the "left and right direction."

Overall Configuration of Dump Truck 1

The dump truck 1 pertaining to this embodiment is a self-propelled, oversize work vehicle used in mining and other such work, and has a width over about 5 meters or more.

Figure 1:
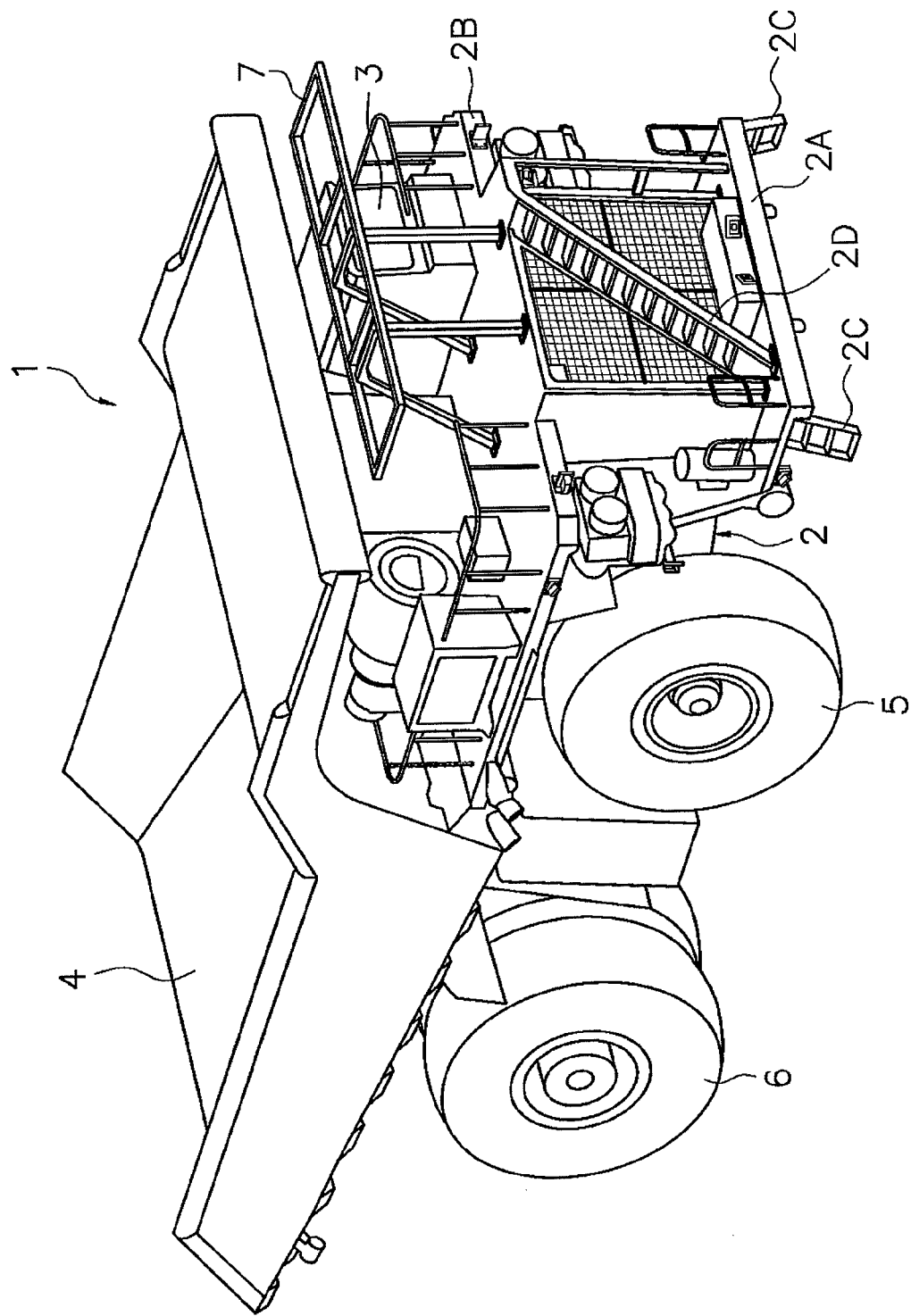
FIG. 1 is an oblique view of the overall configuration of the dump truck pertaining to an embodiment of the present invention.
Figure 2:
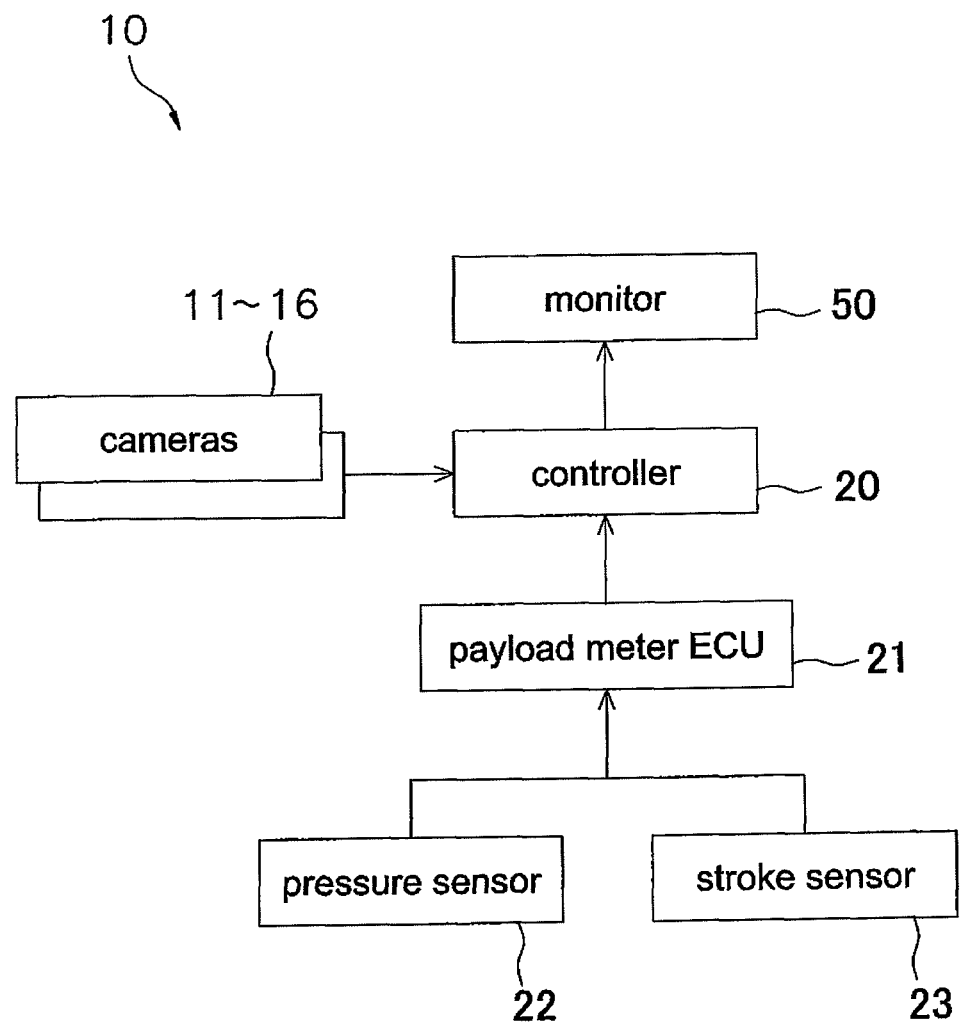
FIG. 2 is a control block diagram of the configuration of a periphery monitoring device for the dump truck in FIG. 1.

As shown in FIG. 1, the dump truck 1 mainly comprises a body frame 2, a cab 3, a vessel 4, right and left pairs of front wheels 5 and rear wheels 6, a base 7 on which is installed a pantograph for supplying power (not shown), and a periphery monitoring device (load display device) 10 for monitoring the vehicle periphery (see FIG. 2). The configuration and operation of the periphery monitoring device 10 will be discussed in detail below.

The body frame 2 supports a diesel engine, a transmission, and other such drive mechanisms, as well as accessory devices (not shown). The left and right front wheels 5 are supported at the front part of the body frame 2, and the left and right rear wheels 6 at the rear. The body frame 2 has a lower deck 2A provided on the side nearest the ground, and an upper deck 2B provided above the lower deck 2A.

Two movable access ladders 2C are provided between the lower deck 2A and the ground. Also, a sloped ladder 2D for going and coming to and from the lower deck 2A and the upper deck 2B is provided between the lower deck 2A and the upper deck 2B. A fence-like handrail is fixed on the upper deck 2B to allow movement around the outer peripheral part of the upper deck 2B.

The cab 3 is disposed to the left of center in the width direction on the upper deck 2B, and has an ROPS (roll-over protection structure) made up of four support bars. The driver is able to easily check the road shoulder on the left side of the vehicle while driving, but has to move his head considerably in order to check around the periphery of the vehicle. The upper deck 2B is also provided with a plurality of side mirrors (not shown) for checking the periphery of the vehicle. Since these side mirrors are located away from the cab 3, the driver also has to move his head considerably when using the side mirrors to check the periphery.

Inside the cab 3 are provided a driver seat, a shift lever, a controller (display controller) 20, a monitor (display component) 50, an accelerator pedal, a brake pedal, and so forth. The controller 20 and the monitor 50 constitute part of the periphery monitoring device 10 (discussed below).

The vessel 4 is a cargo bed for loading gravel or other heavy materials, and is rotatably linked to the rear end of the body frame 2 via a rotation shaft 4a at the rear bottom part. This allows the front part of the vessel 4 to be rotated upward by a hydraulic cylinder 31 (see FIG. 4) or another such actuator into an erect orientation in which the loaded material is dumped, or downward into a loaded orientation in which the front part is located over the cab 3.

The detection of the weight of the cargo placed in the vessel 4, and controlling the display of whether or not there is a cargo on a bird's-eye image 200 (see FIG. 5a, etc.) displayed on the monitor 50, will be discussed in detail below Configuration of Periphery Monitoring Device 10

The periphery monitoring device 10 is a device for monitoring whether or not there are any obstacles in the periphery of the dump truck 1, and as shown in FIG. 2, this device has six cameras 11 to 16, the controller 20, a payload meter ECU (detector) 21, a pressure sensor 22, a stroke sensor 23, and the monitor 50.

Cameras 11 to 16

Figure 3:
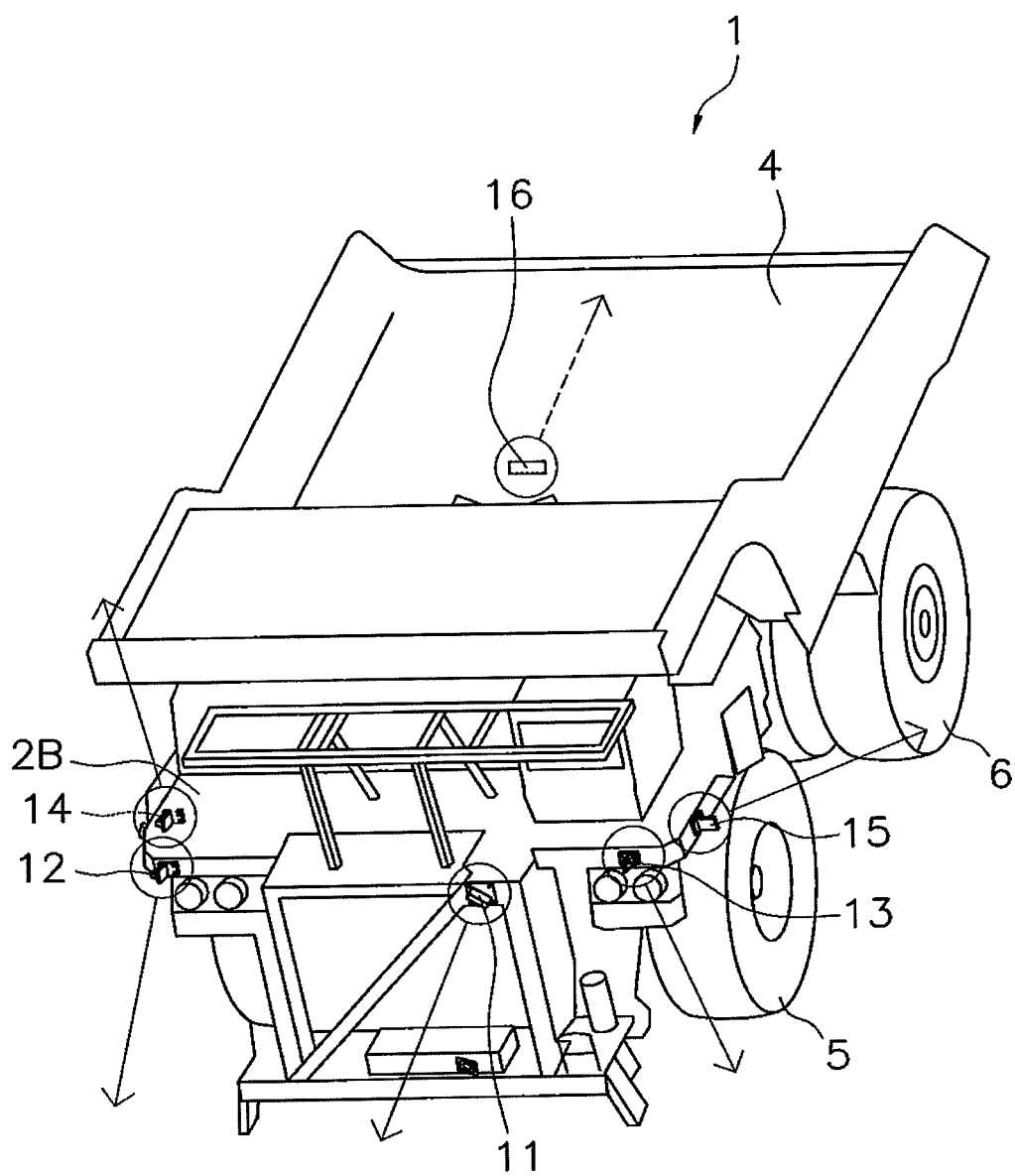
FIG. 3 is an oblique view of the layout of cameras installed on the dump truck in FIG. 1.

As shown in FIG. 3, the six cameras 11 to 16 are attached around the outer peripheral part of the dump truck 1 in order to acquire images over a 360-degree range of the periphery of the dump truck 1. The cameras 11 to 16 have a field range of 120 degrees in the left and right direction (60 degrees each to the left and right) and 96 degrees in the height direction.

As shown in FIG. 3, the front camera 11 is disposed at the lower part of the landing at the top step of the sloped ladder 2D, facing forward from the vehicle body. The capture range of the front camera 11 is the area in front of the vehicle body.

As shown in FIG. 3, the first right-side camera 12 is disposed near the right end of the front face of the upper deck 2B, and faces diagonally in the right-front direction from the vehicle body. The capture range of the first right-side camera 12 is the area diagonally to the right-front of the vehicle body.

As shown in FIG. 3, the first left-side camera 13 is disposed in left-right symmetry with the first right-side camera 12, that is, near the left end of the front face of the upper deck 2B, and faces diagonally in the left-front direction from the vehicle body. The capture range of the first left-side camera 13 is the area diagonally to the left-front of the vehicle body.

As shown in FIG. 3, the second right-side camera 14 is disposed near the front end of the right side face of the upper deck 2B, and faces diagonally in the right-rear direction from the vehicle body. The capture range of the second right-side camera 14 is the area diagonally to the right-rear of the vehicle body.

As shown in FIG. 3, the second left-side camera 15 is disposed in left-right symmetry with a fourth camera, that is, near the front end of the left side face of the upper deck 2B, and faces diagonally in the left-rear direction from the vehicle body. The capture range of the second left-side camera 15 is the area diagonally to the left-rear of the vehicle body.

As shown in FIG. 3, the rear camera 16 is disposed near the rear end of the body frame 2, and faces to the rear of the vehicle body. The capture range of the second left-side camera 15 is the area to the rear of the vehicle body.

As shown in FIG. 5a, the above-mentioned six cameras 11 to 16 make it possible to acquire the bird's-eye image 200, which includes the entire 360-degree periphery around the dump truck 1. The six cameras 11 to 16 also send the controller 20 image data that corresponds to their respective captured images.

Controller 20

As shown in FIG. 2, the controller 20 is connected to the cameras 11 to 16, the payload meter ECU 21, and the monitor 50.

The controller 20 receives captured images from the cameras 11 to 16, combines the images captured over the respective capture ranges by the cameras 11 to 16 after converting the perspective to infinity, and thereby produces the bird's-eye image 200 shown in FIG. 5a.

The controller 20 also receives data related to the weight of the currently loaded cargo from the payload meter ECU 21, combines a cargo image C with the bird's-eye image 200, and displays the result on the monitor 50.

Payload Meter ECU 21

As shown in FIG. 2, the payload meter ECU 21 is connected to the pressure sensor 22 and the stroke sensor 23, and functions as an onboard payload meter that weighs cargo by using data received from the pressure sensor 22 and the stroke sensor 23.

Figure 4:
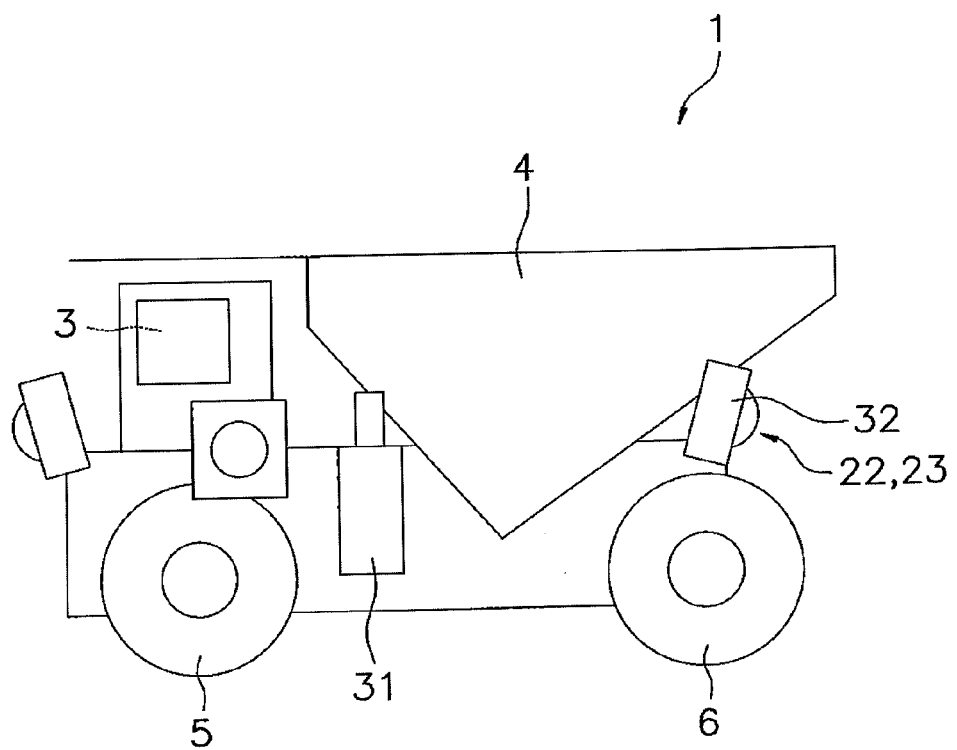
FIG. 4 is a schematic diagram of a suspension cylinder, etc., installed on the dump truck in FIG. 1.
Figure 5:
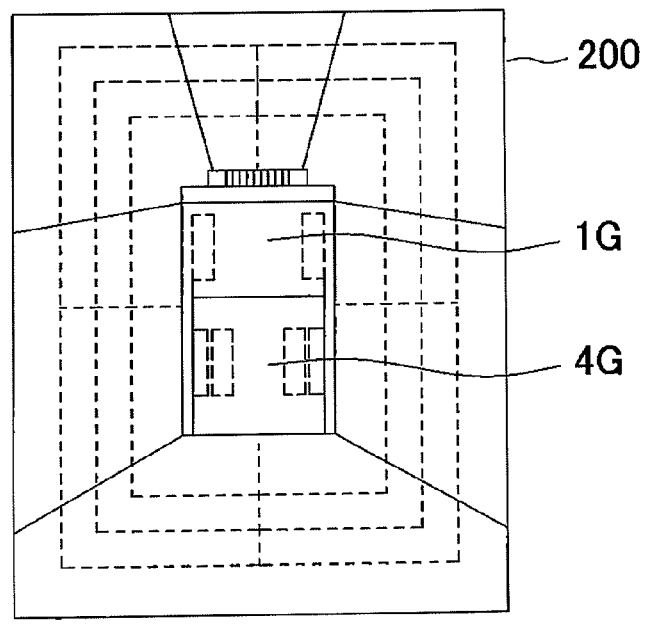
FIG. 5a shows the state when there is no cargo in a bird's-eye image displayed on the monitor screen in FIG. 2.
FIG. 5b shows the state when there is cargo.
Figure 5:
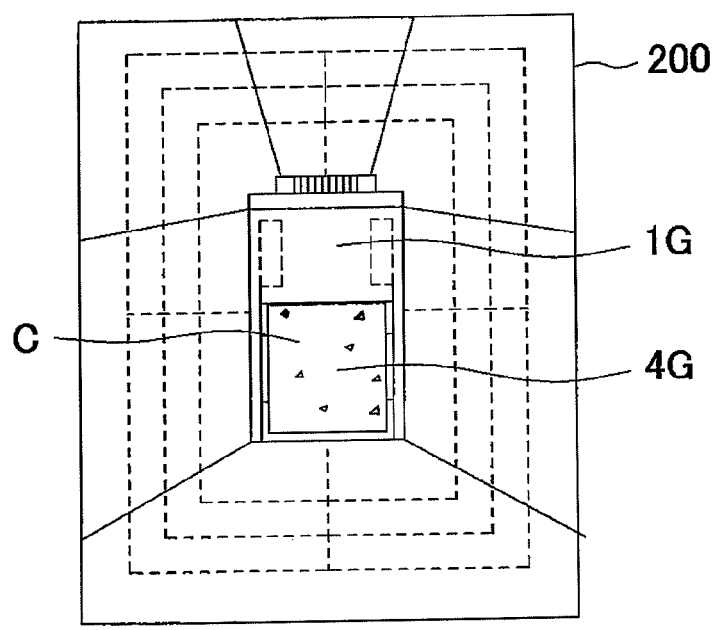

As shown in FIG. 4, the pressure sensor 22 and the stroke sensor 23 connected to the payload meter ECU 21 are provided to a suspension cylinder 32 that supports the vessel 4 from below.

Consequently, the pressure exerted on the suspension cylinder 32 is detected by the pressure sensor 22, and the stroke of the suspension cylinder 32 is detected by the stroke sensor 23, allowing the weight of the cargo loaded into the vessel 4 to be calculated by the payload meter ECU 21.

The load control display based on the weight of the cargo calculated by the payload meter ECU 21 will be discussed below.

Load Control Display

Figure 6:
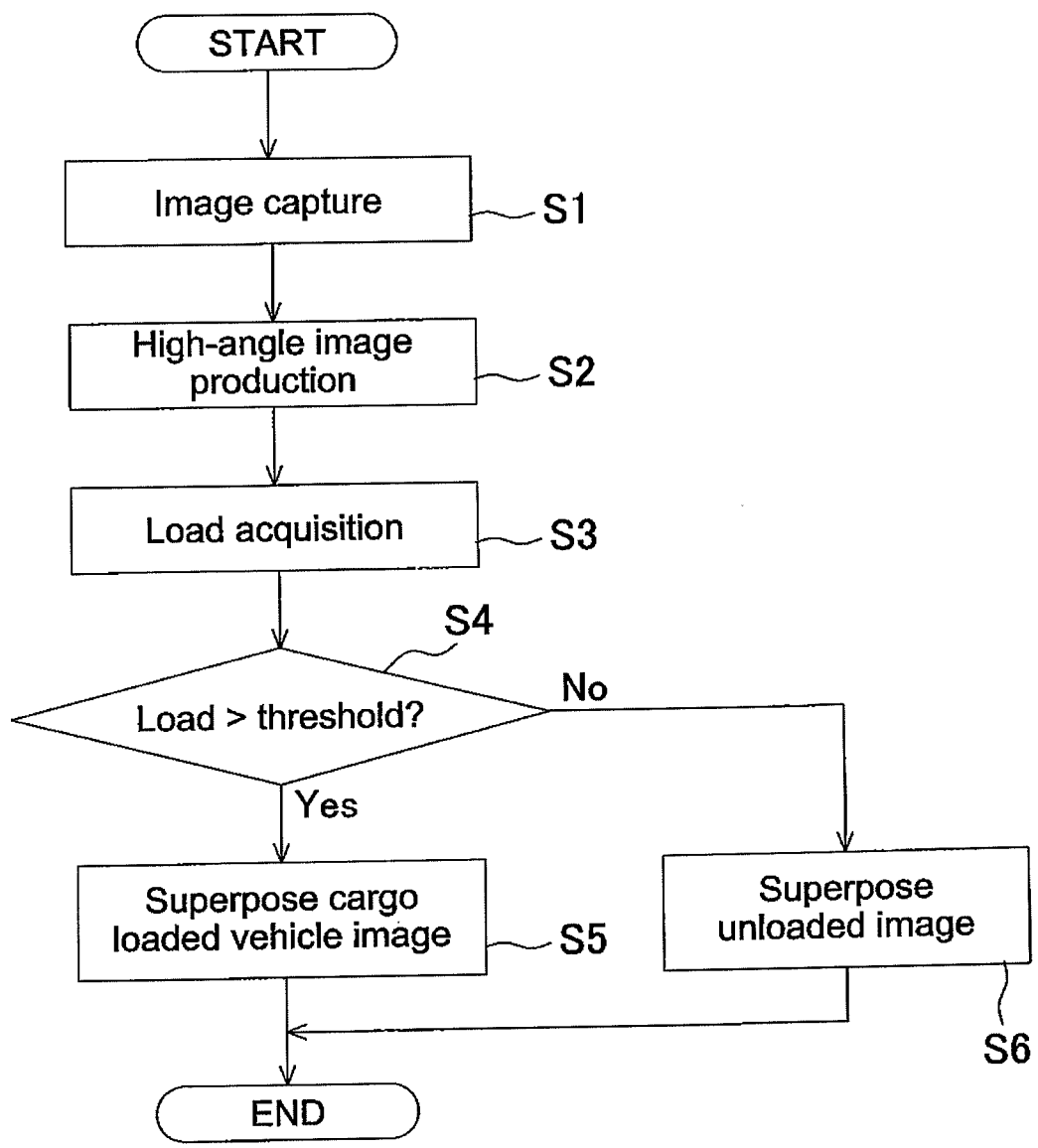
FIG. 6 is a flowchart of the load display control performed by the periphery monitoring device in FIG. 2.
Figure 7:
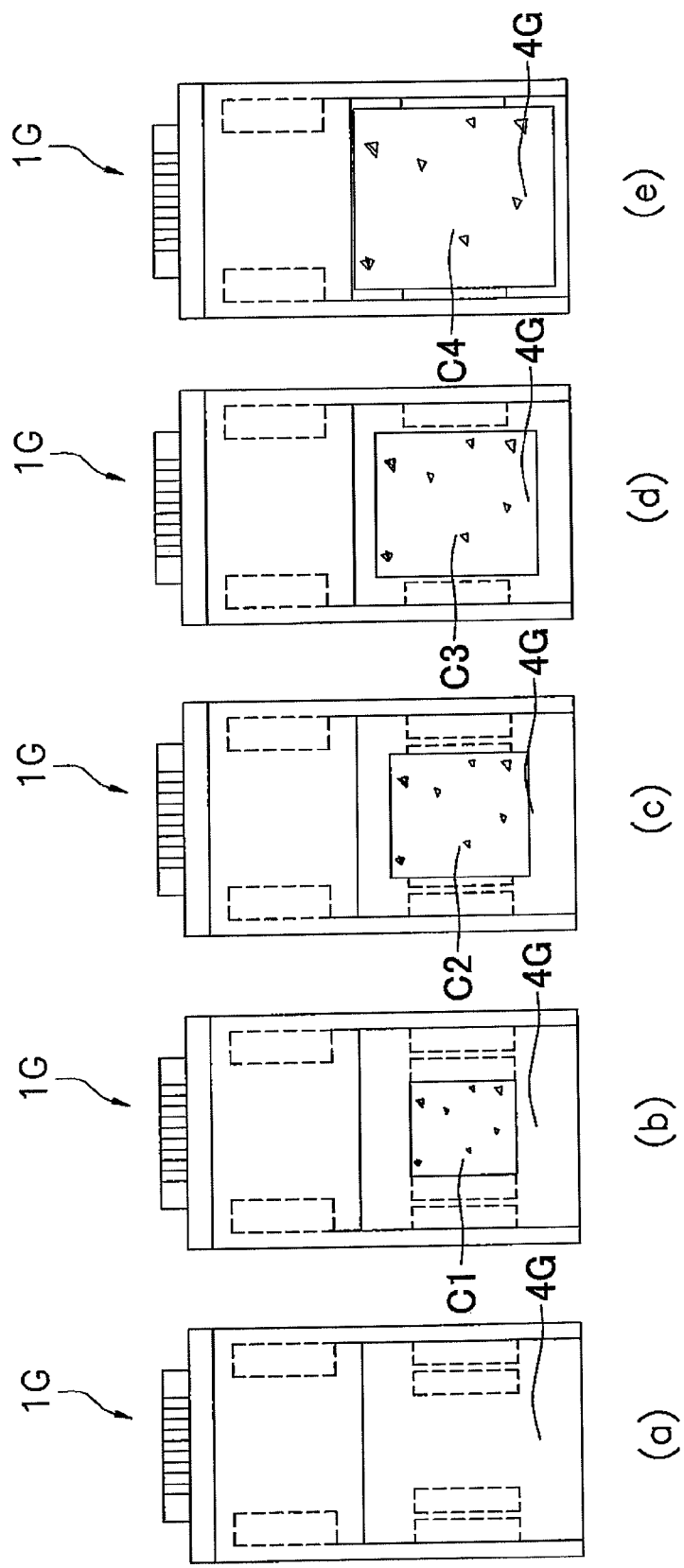
FIGS. 7a to 7e show the change in the load in stages, produced by the dump truck load display device pertaining to another embodiment of the present invention.

With the dump truck 1 in this embodiment, the controller 20 displays on the screen of the monitor 50 whether or not there is cargo in the vessel 4, according to the flowchart shown in FIG. 6.

Specifically, in step Si the controller 20 acquires captured images over the respective capture ranges from the six cameras 11 to 16 installed around the outer peripheral part of the dump truck 1.

Then, in step S2, the controller 20 combines the images acquired from the cameras 11 to 16 after converting the perspective to infinity, and produces a bird's-eye image 200 that covers the 360-degree periphery of the dump truck 1.

Then, in step S3, the controller 20 acquires from the payload meter ECU 21 the weight (payload) of cargo loaded into the vessel 4. As discussed above, data about cargo weight acquired from the payload meter ECU 21 is calculated by the payload meter ECU 21 on the basis of the detection results of the pressure sensor 22 and the stroke sensor 23.

Then, in step S4, the controller 20 determines whether or not the weight (payload) of the cargo acquired from the payload meter ECU 21 is above a specific threshold. If the weight of the cargo is above the threshold, the flow proceeds to step S5, and the weight of the cargo is below the threshold, the flow proceeds to step S6.

In step S5, the controller 20 uses the determination result in step S4 to decide that there is cargo in the vessel 4, and as shown in FIG. 5b, an image 1G of the dump truck 1 in which a cargo image C is displayed over a vessel image 4G is combined and displayed on the monitor 50.

Meanwhile, in step S6, the controller 20 uses the determination result in step S4 to decide that there is no cargo in the vessel 4, and as shown in FIG. 5a, an image 1G of the dump truck 1 in which no cargo image C is displayed over the vessel image 4G is combined and displayed on the monitor 50.

Consequently, the driver in the cab 3 can intuitively tell whether there is currently a cargo loaded, based on whether or not the cargo image C is displayed on the image 1G of the dump truck 1 displayed on the bird's-eye image 200 used for periphery monitoring. Thus, the driver is prevented from mistaking an empty state for a loaded state, or from mistaking a loaded state for an empty state.

Other Embodiments

An embodiment of the present invention was described above, but the present invention is not limited to or by this embodiment, and various modifications are possible without departing from the gist of the invention.

(A) In the above embodiment, an example was described of switching between a state in which there is no cargo (unloaded state) and a state in which there is cargo (loaded state) according to the result of detecting the cargo in the vessel of the dump truck 1. The present invention is not, however, limited to this.

For example, as shown in FIGS. 7a to 7e, the size of the simulated cargo image is switched and displayed in five stages, namely, a state in which there is no cargo and the cargo images C1 to C4, according to the result of detecting the loading weight.

In a specific display control example, a four-stage threshold is provided to the payload meter ECU 21, and when load weights that exceed these thresholds are detected, the cargo images C1 to C4 of stages corresponding to the threshold are combined in display.

In this case, the driver can intuitively recognize not only whether or not there is a cargo, but also the load of the cargo.

(B) In the above embodiment, an example was described of merely switching between a state in which there is no cargo (unloaded state) and a state in which there is cargo (loaded state) according to the result of detecting the weight of cargo in the vessel of the dump truck 1. The present invention is not, however, limited to this.

For example, it is favorable to display the image of the dump truck in a color that stands out, such as yellow or orange, to match the actual body color, or display the cargo image in a different color from the body color, such as brown (earth) or gray (rock), to match the actual cargo color, thereby making it easier for the driver to distinguish the image by color. Alternatively, the simulated cargo image may be displayed in a color that stands out, such as red, orange, or yellow, to make the simulated cargo image easier to distinguish.

This allows the driver to recognize more intuitively whether or not there is cargo, in regard to the loading state of the vehicle.

The dump truck image and the cargo image are not limited to the colors mentioned above, and may be set as desired to an emergency color (yellow, orange, red, etc.) that stands out to the driver, or set to a color preferred by the driver, or may be displayed so as to be more recognizable by the driver, such as by flashing the image portion.

(C) In the above embodiment, an example was described in which the load display device for a dump truck pertaining to the present invention was provided as part of the function of the periphery monitoring device 10, but the present invention is not limited to this.

For example, the periphery monitoring device and the load display device may be provided separately.

(D) In the above embodiment, an example was described in which the payload meter ECU 21, which detected the weight of the cargo loaded into the vessel 4, was used as the detector for detecting the load of the dump truck 1, but the present invention is not limited to this.

For example, a sensor, camera, or the like for detecting whether or not there is a cargo in the dump truck may be used as the detector of the present invention. In this case, since the load weight cannot be ascertained, the size of the simulated cargo image cannot be changed in stages, but the driver will at least be able to recognize whether or not there is a cargo. Accordingly, as in the above embodiment, whether or not there is a cargo can be displayed on the bird's-eye image, so the driver can intuitively check whether or not there is a cargo merely by checking the monitor screen.

(E) In the above embodiment, an example was described in which the display was switched between the image 1G of the dump truck 1 that included the cargo image C and the image 1G of the dump truck 1 that did not include the cargo image C, on the basis of the detection result at the payload meter ECU 21, but the present invention is not limited to this.

For example, an image of the dump truck and an image of the cargo may be separately readied, and whether or not to combine the image of the cargo over the image of the dump truck may be decided on the basis of the result of detecting the load.

The load display device for a dump truck of the illustrated embodiments has the effect that a driver can intuitively recognize a state in which there is cargo in the vessel merely by checking a periphery monitoring screen, and as such can be widely applied to various kinds of construction machinery in which cargo is loaded onto a vessel.

The invention claimed is:

1. A periphery monitoring and load displaying device for a dump truck that is a large work vehicle used in mining, the dump truck having at least a left front wheel, a right front wheel, a left rear wheel, and a right rear wheel, the periphery monitoring and load displaying device comprising:
    a plurality of cameras configured to be installed on the dump truck such that the cameras capture images covering an entire 360-degree periphery of the dump truck;
    a detector configured to detect a load of the dump truck and generate load data corresponding to the detected load;
    a controller arranged to receive the captured images from the cameras and the load data from the detector, the controller being configured to combine the captured images to produce a bird's eye image that includes the dump truck, the front and rear wheels of the dump truck, and the entire 360-degree periphery of the dump truck;
    a display component configured to display the bird's-eye image including an image of the dump truck and the wheels of the dump truck; and
    the controller being configured to generate a simulated cargo image based on the load data and display the simulated cargo image over a portion of the bird's eye image disposed between the rear wheels of the dump truck, the controller being configured to switch a size of the simulated cargo image based on a size of the detected load.

2. The periphery monitoring and load displaying device for a dump truck according to claim 1, wherein
    the display controller is configured to display the size of the simulated cargo image in stages according to the detection result of the detector.

3. The periphery monitoring and load displaying device for a dump truck according to claim 1, wherein
    the display controller is configured to display the simulated cargo image in a different color from that of an image of the dump truck.

4. The periphery monitoring and load displaying device for a dump truck according to claim 1, wherein
    the detector is a payload meter that weighs a cargo loaded on a vessel of the dump truck.

5. The periphery monitoring and load displaying device for a dump truck according to claim 4, wherein
    the payload meter is attached to a suspension cylinder that supports the vessel from below.

* * * * *